United States Patent
Ram et al.

(10) Patent No.: US 11,650,474 B2
(45) Date of Patent: May 16, 2023

(54) CHROMATIC DEVICES COMPRISING A SALT-BASED ELECTROLYTE

(71) Applicant: UNIVERSITY OF SOUTH FLORIDA, Tampta, FL (US)

(72) Inventors: Manoj K. Ram, Palm Harbor, FL (US); Sharan Kumar Indrakar, Tampa, FL (US); D. Yogi Goswami, Tampa, FL (US); Lee K. Stefanakos, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/870,357

(22) Filed: Jul. 21, 2022

(65) Prior Publication Data
US 2022/0357628 A1 Nov. 10, 2022

Related U.S. Application Data (63) Continuation of application No. 16/559,273, filed on Sep. 3, 2019, now Pat. No. 11,402,720, which is a
(Continued)

(51) Int. Cl.
*G02F 1/17* (2019.01)
*G02F 1/00* (2006.01)

(52) U.S. Cl.
CPC .............. *G02F 1/17* (2013.01); *G02F 1/0063* (2013.01); *G02F 1/0081* (2013.01)

(58) Field of Classification Search
CPC ......... G02F 1/0063; G02F 1/0081; G02F 1/17
See application file for complete search history.

(56) References Cited

U.S. PATENT DOCUMENTS

| | | | | |
|---|---|---|---|---|
| 5,422,194 A | * | 6/1995 | Satoh | ................ G02F 1/133512 |
| | | | | 252/500 |
| 7,411,716 B2 | | 8/2008 | Oh et al. | |

(Continued)

FOREIGN PATENT DOCUMENTS

| | | |
|---|---|---|
| CN | 1015337406 | 11/2013 |
| WO | 2014074743 | 5/2014 |

OTHER PUBLICATIONS

Ram et al., Conducting polymer nanocomposite membrane as chemical sensors, Sensors for chemical and biological applications, 1st edn. CRC Press, Boca Raton, FL, DOI (2010) 43-72.
(Continued)

*Primary Examiner* — Charlie Y Peng
(74) *Attorney, Agent, or Firm* — Quarles & Brady, LLP; Yakov Sidorin (57) ABSTRACT

In one embodiment, a chromatic device includes a transparent conductive substrate, an active layer provided on the conductive substrate, the active layer comprising a conducting polymer, an electrolyte layer in contact with the conductive substrate and the active layer, the electrolyte comprising an oxidant and a salt but not comprising an acid, and a metal element configured to be selectively placed in and out of direct electrical contact with the conductive substrate or the active layer, wherein the active layer has a color that blocks light when the metal element is not in electrical contact with the conductive substrate but changes to a translucent color that transmits light when the metal element is placed in electrical contact with the conductive substrate or the active layer, wherein the active layer changes color without applying external energy to the active layer.

6 Claims, 6 Drawing Sheets

Related U.S. Application Data continuation of application No. 15/496,726, filed on Apr. 25, 2017, now Pat. No. 10,416,524.

(56) References Cited

U.S. PATENT DOCUMENTS

| | | | |
|---|---|---|---|
| 8,456,005 B2 * | 6/2013 | Suzuki | C09D 7/61 |
| | | | 313/506 |
| 9,684,218 B2 | 6/2017 | Ram et al. | |
| 9,778,534 B2 | 10/2017 | Tran et al. | |
| 10,294,415 B2 | 5/2019 | Vasiliev et al. | |
| 11,079,649 B2 | 7/2021 | Ram et al. | |

OTHER PUBLICATIONS

Paddeu et al., Langmuir-Schaefer films of a poly (o-anisidine) conducting polymer for sensors and displays, Nanotechnology, 9 (1998) 228.

Ram et al., Electrochemical and optical characteristics of conducting poly (o-toluidine) films, Thin Solid Films, 304 (1997) 65-69.

Ram et al., Optical, structural and fluorescence microscopic studies on reduced form of polyaniline: The leucoemeraldine base, Synthetic metals, 89 (1997) 63-69.

Ram et al., The electrochromic response of polyaniline and its copolymeric systems, Thin solid films, 303 (1997) 27-33.

Ram et al., Preparation and characterization of Langmuir-Blodgett films of polyemeraldine base, Polymer, 37 (1996) 4809-4813.

Ram et al., Performance of electrochromic cells of polyaniline in polymeric electrolytes, Journal of materials science letters, 13 (1994) 1490-1493.

Peikertova et al., Study Of Protonation State Of Polyaniline Thin Film In Dependence On Storage Conditions, DOI. 23-25, 2012.

Trchova et al., Raman spectroscopy of polyaniline and oligoaniline thin films, Electrochimica Acta, 122 (2014) 28-38.

Ram et al., CO gas sensing from ultrathin nano-composite conducting polymer Film, Sensors and Actuators B: Chemical, 106 (2005) 750-757.

Alvi et al., Evaluating the chemio-physio properties of novel zinc oxide-polyaniline nanocomposite polymer films, Polymer journal, 42 (2010) 935-940.

Hatchatt et al., Electrochemical formation of Au clusters in polyaniline, Chemistry of materials, 11 (1999) 2989-2994.

Misra et al., Vacuum-deposited metal/polyaniline Schottky device, Applied physics letters, 61 (1992) 1219-1221.

Rodriguez et al., In situ FTIR study of redox and overoxidation processes in polypyrrole films, Journal of Electroanalytical Chemistry, 491 (2000) 117-125.

* cited by examiner

CHROMATIC DEVICES COMPRISING A SALT-BASED ELECTROLYTE

CROSS-REFERENCE TO RELATED APPLICATIONS

This application is a continuation of the U.S. patent application Ser. No. 16/559,273 filed on Sep. 3, 2019, which in turn is a continuation of the U.S. patent application Ser. No. 15/496,726 filed on Apr. 25, 2017 and now granted as U.S. Pat. No. 10,416,524. The disclosure of each of the above-identified patent documents is incorporated by reference herein.

BACKGROUND

Windows are responsible for 30% of the heating and cooling loads in buildings. Thin film coatings on glass with color change capabilities could reduce energy consumption by reflecting unwanted radiation and transmitting needed radiation during daylight hours. Dynamic daylight and solar energy control in buildings presently can be achieved using smart windows based on electrochromic, gasochromic, liquid crystal, or electrophoretic devices. However, commercial versions of such technologies have not become popular due to their high costs. Furthermore, electrochromic windows require electrical energy to switch from one state to the other, and liquid crystal windows require continuous energy to remain in the transparent or colored state.

In view of the drawbacks of such technologies, the inventors developed alternative chromatic devices that are less expensive to produce and operate than existing devices. In particular, the inventors developed chromatic devices that comprise an electrolyte in contact with a colored active layer that becomes translucent or transparent when metal is placed in electrical contact with the active layer. While such chromatic devices work well, their electrolytes include an acid that, at least in some cases, makes fabrication of commercial chromatic devices more challenging. It would therefore be desirable to have chromatic devices that operate in a similar manner but that do not comprise an acid within the electrolyte.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have chromatic devices that comprise an electrolyte in contact with a colored active layer that becomes translucent or transparent when metal is placed in electrical contact with the active layer, but that do not comprise an acid in the electrolyte. Examples of such chromatic devices are disclosed herein. In some embodiments, the chromatic devices comprise an active layer that includes a conducting polymer and an electrolyte that comprises an oxidant and a salt. In its natural state, the conducting polymer has a color that blocks or absorbs light. When metal is placed in electrical contact with the conducting polymer, however, the conducting polymer becomes translucent or transparent so that it can transmit light.

In the following disclosure, various specific embodiments are described. It is to be understood that those embodiments are example implementations of the disclosed inventions and that alternative embodiments are possible. All such embodiments are intended to fall within the scope of this disclosure.

In U.S. Pat. No. 9,684,218 ("the '218 patent"), which is hereby incorporated by reference herein it its entirety, the inventors disclosed chromatic devices that comprise an active layer that is in contact with an electrolyte layer. The active layer comprises a colored conducting polymer that exhibits "touchchromism" in which the conducting polymer becomes translucent or transparent when metal is placed in electrical contact with the active layer. The electrolyte layer comprises an oxidant and an organic or inorganic acid. As noted above, the presence of the acid in the electrolyte can, at least in some cases, make fabrication of commercial chromatic devices more challenging. In view of this, the inventors determined to conduct research to develop electrolytes for use in chromatic devices that do not comprise an acid. Through this research, it was discovered that electrolytes comprising an oxidant and a salt can be used in lieu of electrolytes comprising an acid. As described below, chromatic devices comprising electrolyte layers containing an oxidant and a salt were developed and tested. These chromatic devices were found to exhibit touchchromism similar to that exhibited by the chromatic devices disclosed in the '218 patent.

Figure 1A:
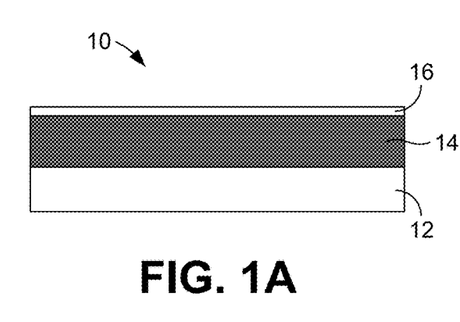
FIGS. 1A and 1B are schematic drawings of a first embodiment of a chromatic device.
Figure 1B:
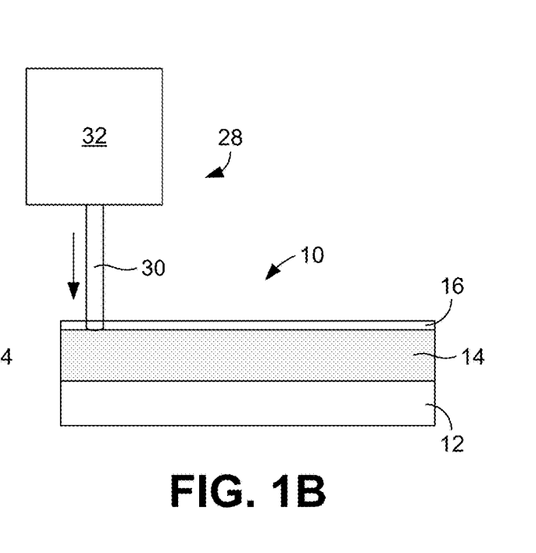
Figure 2A:
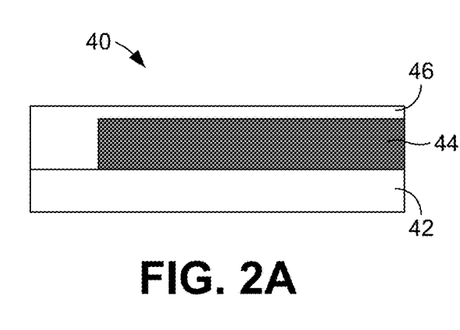
FIGS. 2A and 2B are schematic drawings of a second embodiment of a chromatic device.
Figure 2B:
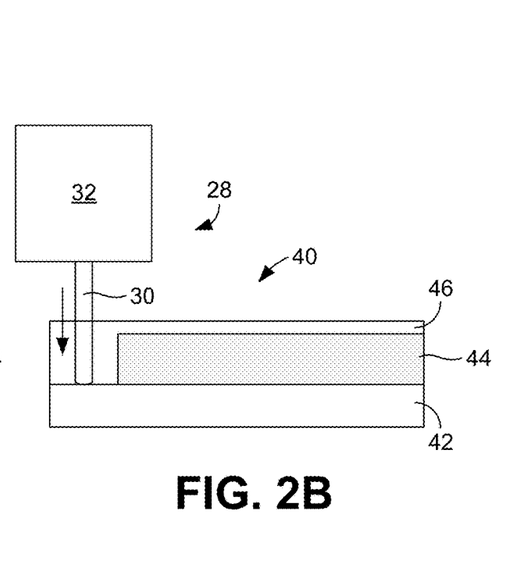

FIGS. 1 and 2 illustrate two examples of chromatic devices in accordance with this disclosure. It is noted that these chromatic devices can be used as or can otherwise be incorporated into windows that can be alternately placed in a first state in which they block or absorb light and a second state in which they transmit light, depending on the desired effect. As used herein, phrases such as "blocking" or "absorbing" light or "reducing" or "limiting" the amount of light that can pass are not intended to be limited to situations in which no light can pass through the chromatic device. Accordingly, when a chromatic device is described herein as blocking, absorbing, reducing, limiting, etc. light or light transmission, the device may still enable some light to pass. In similar manner, phrases such as "transmitting" light or "enabling" light to pass are not intended to be limited to situations in which all light can pass through the chromatic device without any light being blocked or absorbed. Accordingly, a chromatic device that transmits light, enables light to pass, etc. may block or absorb some light and does not necessarily need to be completely transparent. Generally speaking then, the chromatic devices disclosed herein can be described as having a first state in which relatively lower amounts of light can pass and a second state in which relatively higher amounts of light can pass.

Beginning with FIG. 1A, a chromatic device 10 generally comprises three layers of material, including a substrate 12, an active layer 14, and an electrolyte layer 16. The substrate 12 comprises a transparent material that is coated with a transparent, electrically conductive film. In some embodiments, the substrate 12 comprises a glass or plastic plate. The transparent, electrically conductive film can, in some embodiments, comprise a transparent conducting oxide (TCO), such as indium tin oxide (ITO), fluorine doped tin oxide (FTO), or doped zinc oxide (ZnO). Irrespective of the composition of the transparent, electrically conductive film, the film at least covers the surface of the substrate 12 that faces the active layer 14.

The active layer 14 comprises one or more conducting polymers. Suitable conducting polymers can include polyanilines (e.g., polyaniline (PANI), poly(ortho-anisidine) (POAS), poly(o-toluidine) (POT), poly(ethoxy-aniline) (POEA)), substituted polyanilines, polypyrroles, substituted polypyrroles, polythiophenes, polyindole, polycarbazole, substituted polycarbazole, polyaniline-rhodamine, polypyrrole-rhodamine, polythiophene-rhodamine, and mixtures thereof.

The conducting polymer of the active layer 14 can, in its natural state, have a color that blocks or absorbs light, as represented in FIG. 1A. As an example, polyaniline can exist in a leucomeraldine state (faded yellow to transparent), an emeraldine state (blue to green), or a pernigraniline state (violet). In some embodiments, the conducting polymer can be an opaque color. In other embodiments, the conducting polymer can contain one or more dyes that make the polymer darker and, therefore, enables thinner active layers to be used. Example dyes include congo red, methylene blue, methylene blue, eosin Y, methyl viologen, methyl orange, rhodamin B, crystal violet, acid fuschin, nigrosine, cationic dye, methyl orange, and orange G.

In some embodiments, the active layer 14 is formed as a homogeneous conducting polymer film. In other embodiments, the active layer 14 is formed as a composite film that comprises a mixture of one or more conducting polymers (with or without a dye) and one or more nanoparticles that provide structural stability to the layer and/or increase the conductivity of the layer. Example nanoparticles include metal oxides, such as tungsten oxide ($WO_3$), tin oxide ($SnO_2$), indium(III) oxide ($In_2O_3$), and titanium oxide ($TiO_2$), cerium oxide ($CeO_2$), copper oxide (CuO), cobalt oxide (CoO), nickel oxide (NiO), and manganese oxide (MnO), graphene, and diamond.

Irrespective of whether it comprises a homogeneous layer or a composite layer, the active layer 14 can be deposited on the substrate 12 using any one of a variety of techniques, including electrochemically, by solution cast, or using a self-assembly technique.

The electrolyte layer 16 comprises an oxidant and a salt. Significantly, the electrolyte layer 16 contains no acids. Example oxidants include aluminum nitrate ($Al(NO_3)_3$), ammonium dichromate (($NH_4)_2Cr_2O_7$), ammonium perdisulphate (APS) (($NH_4)_2S_2O_8$), barium nitrate ($Ba(NO_3)_2$), bismuth nitrate ($Bi(NO_3)_3.5H_2O$), calcium hypoperchlorate ($Ca(ClO_2)_2$), copper (II) nitrate ($Cu(NO_3)_2$), cupric nitrate ($Cu(NO_3)_2$), ferric nitrate ($Fe(NO_3)_3$), hydrogen peroxide ($H_2O_2$), lithium hydroxide monohydrate (LiOH), magnesium nitrate ($Mg(NO_3)_2$), magnesium perchlorate ($Mg(ClO_4)_2$), potassium chlorate ($KClO_3$), potassium dichromate ($K_2Cr_2O_7$), potassium permanganate ($KMnO_4$), sodium hypochlorite (NaClO), sodium periodate ($NaIO_4$), zinc nitrate hydrate ($Zn(NO_3)_2$), ammonium nitrate (($NH_4)(NO_3)$), silver nitrate ($AgNO_3$), benzoyl peroxide ($C_{14}H_{10}O_4$), tetranitromethane ($CN_4O_8$), sodium perchlorate ($NaClO_4$), potassium perchlorate ($KClO_4$), potassium persulfate ($K_2S_2O_8$), sodium nitrate ($NaNO_3$), potassium chromate ($K_2CrO_4$), and mixtures thereof.

Example salts include sodium chloride (NaCl), cobalt(II) chloride ($CoCl_2$), potassium chloride (KCl), magnesium chloride ($MgCl_2$), methylmagnesium chloride ($CH_3MgCl$), lithium chloride (LiCl), lithium bromide (LiBr), lithium iodide (Lip, lithium sulfate ($Li_2SO_4$), lithium trifluoromethanesulfonate ($CF_3SO_3Li$), lithium trifluoroacetate ($LiCO_2CF_3$), potassium bromide (KBr), potassium iodide (KI), isopropylmagnesium chloride (($CH_3)_2CHMgCl$), lithium sulfate monohydrate ($Li_2SO_4$), potassium acetate ($CH_3CO_2K$), sodium acetate ($C_2H_3NaO_2$), potassium aspartate ($C_4H_6KNO_4$), sodium aspartate ($C_4H_5NNa_2O_4$), potassium malate ($K_2(C_2H_4O(COO)_2)$), sodium acetate ($C_2H_3NaO_2$), ammonium acetate ($C_2H_7NO_2$), pyridinium hydrochloride ($C_5H_6ClN$), sodium nitrate ($NaNO_3$), benzenediazonium chloride ($C_6H_5ClN_2$), N-(1-butyl)pyridinium chloride ($C_9H_{14}ClN$), tetra-n-butylammonium fluoride (($C_4H_9)_4NF$), monosodium glutamate ($C_5H_8NO_4Na$), phosphonates, hydrazinium salts, urates, diazonium salts, oxalate salts, triphenylmethyl hexafluorophosphate ($C_{19}H_{15}F_6P$), tartrates, aluminum monostearate ($Al(OH)_2C_{18}H_{35}O_2$), triphenylmethyl hexafluorophosphate ($C_{19}H_{15}F_6P$), tetrapropylammonium perruthenate ($C_{12}H_{28}NRuO_4$), sorbates, ammonium chloride ($NH_4Cl$), barium chlorate monohydrate ($Ba(ClO_3)_2.H_2O$), calcium chloride anhydrous ($CaCl_2$), magnesium chloride anhydrous ($MgCl_2$), magnesium chromate hydrate ($MgCrO_4.xH_2O$), magnesium iodide anhydrous ($MgI_2$), magnesium nitrate hexahydrate ($H_{12}MgN_2O_{12}$), magnesium sulfate monohydrate ($MgSO_4.H_2O$), ammonium sodium phosphate dibasic tetrahydrate ($H_5NNaO_4P$), manganese(II) sulfate monohydrate ($H_2MnO_5S$), magnesium bromide hexahydrate ($MgBr_2.6H_2O$), magnesium iodate tetrahydrate ($Mg(IO_3)_2.4H_2O$), and mixtures thereof.

In the presence of the electrolyte, the conducting polymer of the chromatic device 10 changes color (i.e., fades) when contacted by metal. In some embodiments, the chromatic device 10, or a system that comprises it, can include an activation mechanism 28, shown in FIG. 1B, that can be used to effect this color change. In some embodiments, the mechanism 28 can comprise a metal element 30, such as a metal pin, and a displacement mechanism 32, such as a linear actuator, that can move the metal element into and out of contact with the active layer 14. The metal element 30 can be made of any suitable metal, such as copper, steel, nickel, zinc, iron, indium, tin, aluminum, manganese, cobalt, palladium, silver, lithium, magnesium, and alloys thereof. When the metal element 30 is placed in electrical contact with the active layer 14, the color of the conducting polymer fades so as to enable light to pass, or pass more easily, through the layer.

When the chromatic device 10 is used as a window or is used in conjunction with a window, the metal element 30 can be selectively placed in electrical contact with the active layer 14 to enable light, such as sunlight, to pass through the window. When it is desired to block or absorb this light, the metal element 30 can be selectively placed out of electrical contact with the active layer 14 to increase the darkness of the active layer. Significantly, no external (e.g., electrical) energy is required to maintain either state. Instead, the color change is induced simply by supplying electrons from the metal element 30 to the conducting polymer.

FIG. 2A illustrates a second embodiment of a chromatic device 40. As is shown in this figure, the chromatic device 40 also comprises a substrate 42, an active layer 44, and an electrolyte layer 46, which can comprise configurations and compositions similar to the like-named layers described above in relation to FIG. 1A. However, the electrolyte layer 46 of the device 40 extends over a lateral edge of the active layer 44 and makes contact with the top surface of the substrate 42. Because of the presence of the transparent, electrically conductive film provided on the surface of the substrate 42, contact between the metal element 30 and the substrate effects a color change in the conducting polymer of the active layer 44.

Experiments were performed using various materials to test the effectiveness in those materials in creating a chromatic device of the type described above. Conducting polymer films (i.e., active layers) deposited on FTO glass plates (i.e., substrates) were first fabricated by preparing a solution of aniline monomer, methylene blue dye, and hydrochloric acid (HCl). 5 ml of aniline and 0.01 M of methylene blue were dissolved in 100 ml of 1 M of HCl solution. This solution was stirred for 8 hours to obtain a homogenous solution. A film based on the solution was then deposited in an electrochemical cell having an FTO working electrode and a stainless steel counter electrode, and a current of 10 mA was applied to the solution for 8 minutes to produce a uniform polyaniline-dye film, which was later washed with water.

Next, various electrolyte solutions were created. Each electrolyte solution comprised a salt to be tested and APS as an oxidant. In these solutions, the salt concentration varied from 0.0001 to 2 M and the APS concentration was maintained at 0.1 M. Once created, the electrolyte solutions were applied to the conducting films to form chromatic devices having configurations similar to those described above.

Figure 3:
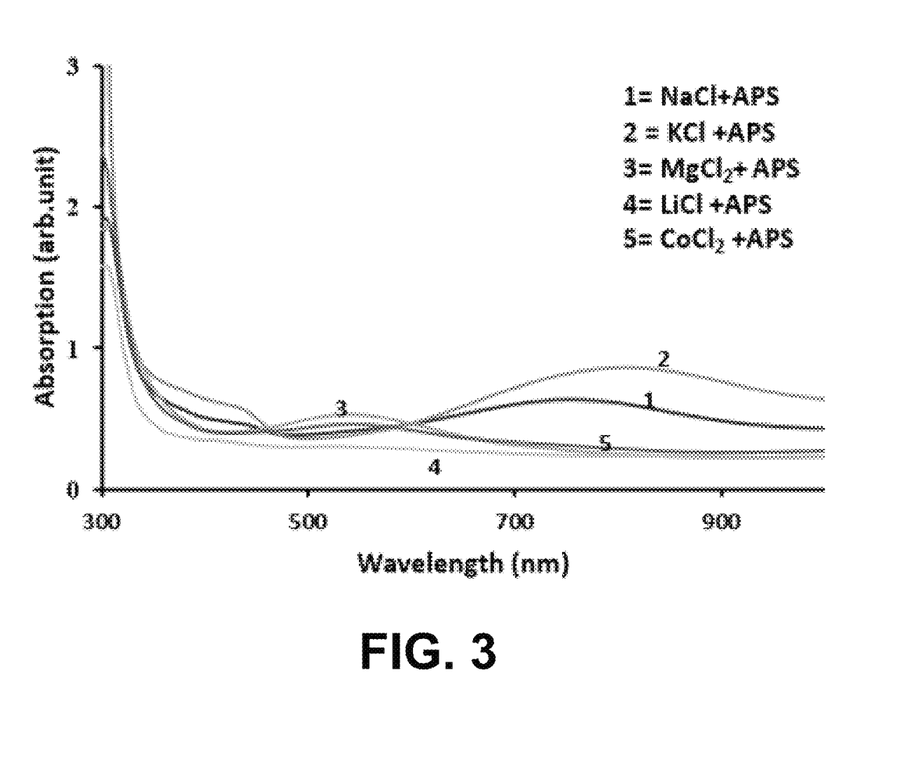
FIG. 3 is a graph that shows UV-visible spectra of chromatic devices having a polyaniline-dye active layer treated with various electrolytes.

Once the chromatic devices were formed, ultraviolet (UV) studies were performed. FIG. 3 is a graph that shows the UV-visible spectra (curves 1-5) of polyaniline-dye active layers on ITO glass plates treated with different electrolytes (i.e., chromatic devices). Curve 1 shows the spectra for a chromatic device having NaCl+APS electrolyte, curve 2 shows the spectra for a chromatic device having KCl+APS electrolyte, curve 3 shows the spectra for a chromatic device having $MgCl_2$+APS electrolyte, curve 4 shows the spectra for a chromatic device having LiCl+APS electrolyte, and curve 5 shows the spectra for a chromatic device having $CoCl_2$+APS electrolyte.

Curve 1 shows UV-visible absorption peaks at 750, 437, 375, and 311 nm for the NaCl+APS based device. Interestingly, the presence of a peak at 750 nm is the salt of the electrolyte dopant in the polyaniline structure whereas the peak at 475 nm is due to polaron and bipolaron in the nanocomposite structure. The peaks at 311 to 375 nm are due to $\pi$-$\pi$* of the polyaniline structure. Curve 2 shows UV-visible absorption peaks at 813, 437, 386, and 301 nm for the KCl+APS based device. The KCl+APS doping results in a shift of the UV-visible absorption peak from 750 nm to 813 nm. Curve 3 shows UV-visible absorption peaks at 539 and 311 nm for the $MgCl_2$+APS based device. Curve 4 shows UV-visible absorption peaks at 414 and 306 nm for the LiCl+APS based device. Curve 5 shows UV-visible absorption peaks at 443 and 302 nm for the $CoCl_2$+APS based device. Notably, as peaks were not observed in range of 700 to 900 nm for the LiCl+APS and $CoCl_2$+APS based devices, those devices do not quickly change color.

Figure 4:
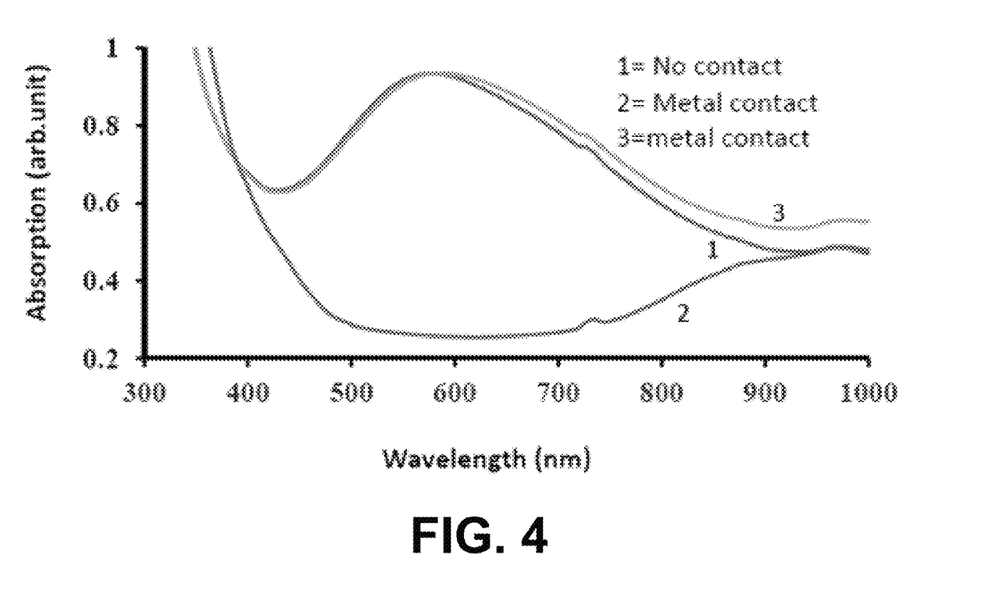
FIG. 4 is a graph that shows UV-visible spectra of a chromatic device having a polyaniline-dye active layer treated with magnesium chloride ($MgCl_2$)+ammonium persulphate (APS) electrolyte, both with and without contact with metal.

FIG. 4 is a graph that shows UV-visible spectra of a chromatic device having a polyaniline-dye active layer and an $MgCl_2$+APS electrolyte layer, both with and without contact with metal. Curve 1 shows UV-visible absorption peaks at 579, 886, and 972 nm for the device prior to contact with metal. Curve 2 shows UV-visible absorption peaks at 881 and 972 nm after the polyaniline-dye active layer was placed in electrical contact with a metal element. Curve 3 shows UV-visible absorption peaks at 578, 876, and 974 nm immediately after removal of the metal element. As can be appreciated from comparison of curves 1 and 2, there is a 65% change in absorption between when metal is and is not in contact with the active layer.

Figure 5:
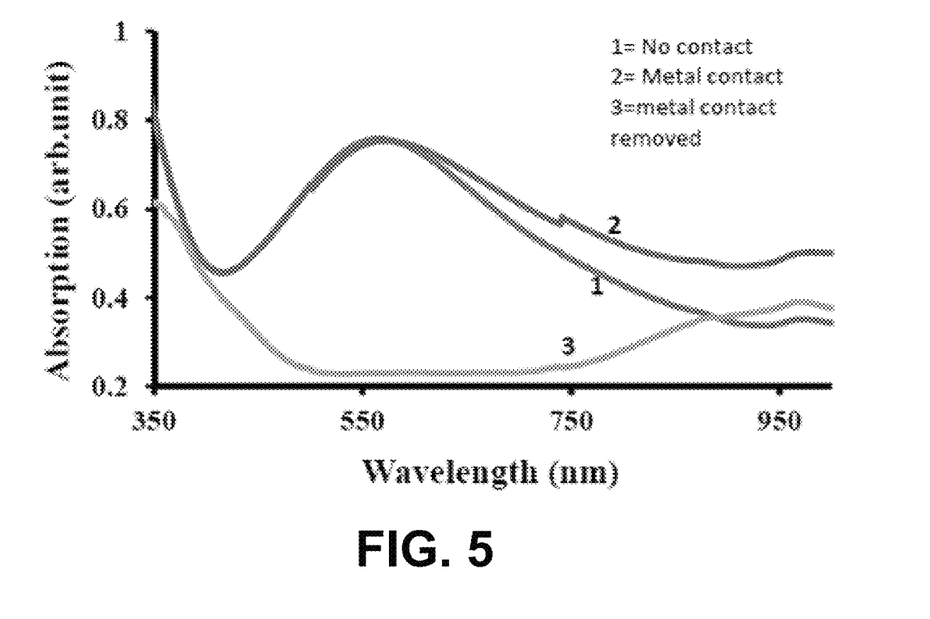
FIG. 5 is a graph that shows the UV-visible spectra for a chromatic device having a polyaniline-dye active layer and treated with potassium chloride (KCl)+APS electrolyte, both with and without contact with metal.

FIG. 5 is a graph that shows the UV-visible spectra for a chromatic device having a polyaniline-dye active layer and KCl+APS electrolyte, both with and without contact with metal. Curve 1 shows UV-visible absorption peaks at 560, 870, and 964 nm when there is no contact with metal. Curve 2 shows UV-visible absorption peaks at 569, 883, and 963 nm after the polyaniline-dye active layer was placed in electrical contact with a metal element. Curve 3 shows UV-visible absorption peaks at 371, 885, and 971 nm immediately after removal of the metal element. As can be appreciated from comparison of curves 1 and 2, there is a 65-68% change in absorption at 550 nm between when metal is and is not in contact with the active layer.

Figure 6:
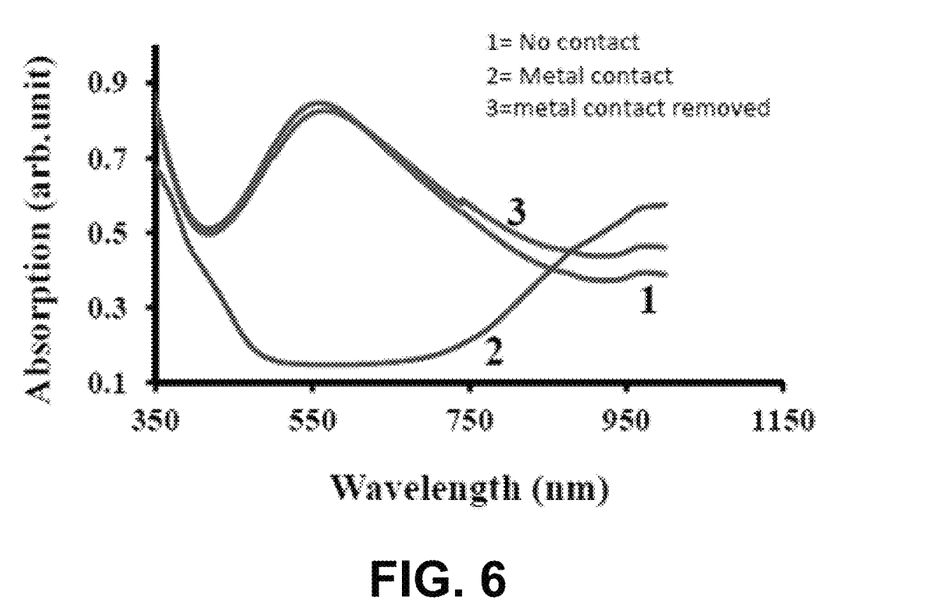
FIG. 6 is a graph that shows the UV-visible spectra for a chromatic device having a polyaniline-dye active layer treated with sodium chloride (NaCl)+APS electrolyte, both with and without contact with metal.

FIG. 6 is a graph that shows the UV-visible spectra for a chromatic device having a polyaniline-dye active layer and NaCl+APS electrolyte, both with and without contact with metal. Curve 1 shows UV-visible absorption peaks at 556, 882, and 976 nm when there is no contact with metal. Curve 2 shows UV-visible absorption peaks at 372, 422, 885, and 968 nm after the polyaniline-dye active layer was placed in electrical contact with a metal element. Curve 3 shows UV-visible absorption peaks at 562, 879, and 969 nm immediately after removal of the metal element. As can be appreciated from comparison of curves 1 and 2, there is a 65% change in absorption at 550 nm between when metal is and is not in contact with the active layer.

Figure 7:
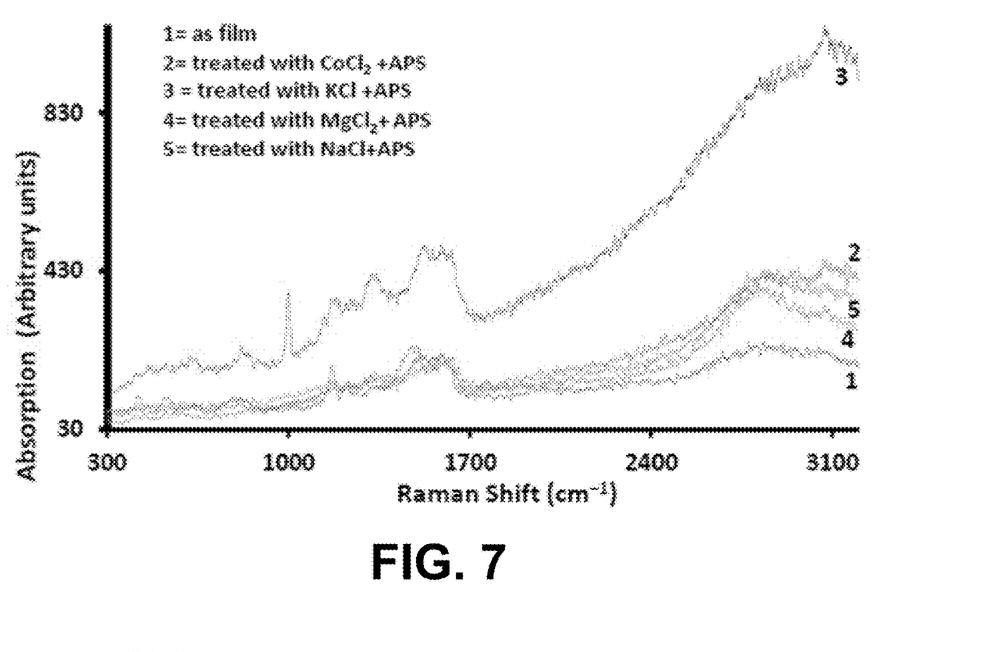
FIG. 7 is a graph that shows the Raman spectra of a chromatic device having a polyaniline-dye active layer deposited on a silicon substrate treated with various electrolytes.

Raman spectroscopy was also performed to evaluate the chromatic devices. FIG. 7 is a graph that shows the Raman spectra of a polyaniline-dye active layer deposited on a silicon substrate and treated with various electrolytes. Curve 1 shows Raman absorption peaks for the active layer without any electrolyte at 2825, 1621, 1597, 1488, 1332, 1231, 1170, 1018, 826, 543, and 433 $cm^{-1}$. Curve 2 shows Raman absorption peaks at 3003, 1636, 1531, 1344, 824, 666, 460 $cm^{-1}$ for the polyaniline-dye active layer when treated with $CoCl_2$+APS electrolyte. Curve 3 shows Raman absorption peaks at 3084, 1594, 1524, 1334, 1188, 1001, 819, 629, 474 $cm^{-1}$ for the polyaniline-dye active layer when treated with KCl+APS electrolyte. Curve 4 shows Raman absorption peaks at 2855, 1630, 1530, 1331, 1188, 822 and 671 cm$^{-1}$ for the polyaniline-dye active layer when treated with MgCl$_2$+APS electrolyte. Finally, curve 5 shows Raman absorption peaks at 2845, 1614, 1525, 1341, 1247, 855 and 600 cm$^{-1}$ for the polyaniline-dye active layer when treated with NaCl+APS electrolyte.

Figure 8:
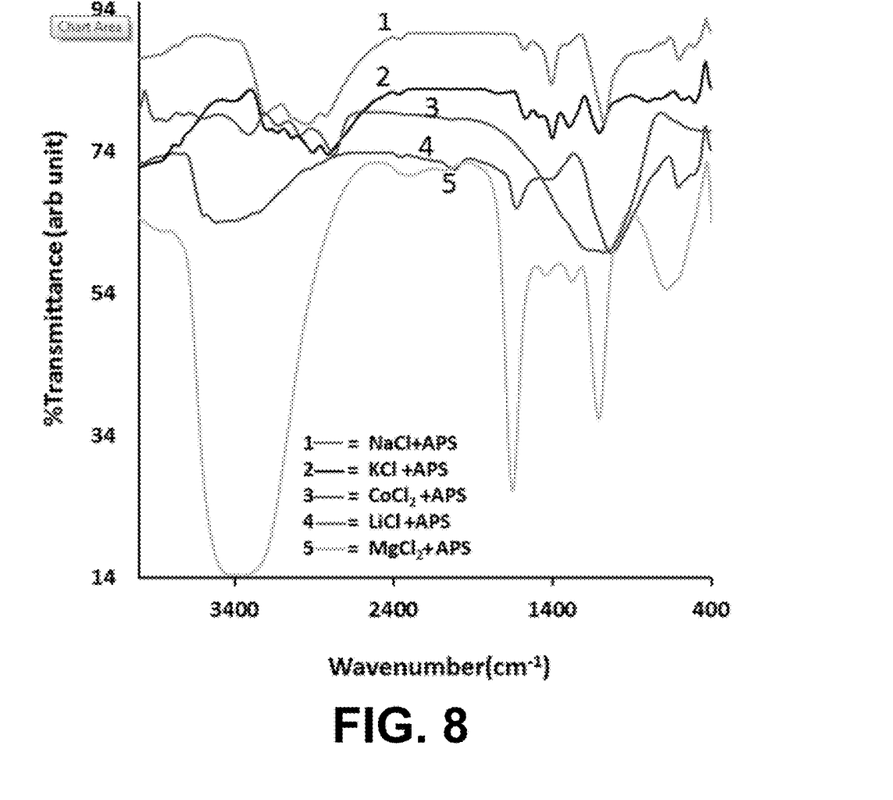
FIG. 8 is a graph that shows the Fourier transform infrared (FTIR) spectra of a chromatic device having a polyaniline-dye active layer deposited on a silicon substrate treated with various electrolytes.

The Raman shifts are well pronounced as compared with the infrared peak (discussed below in relation to FIG. 8). However, a Raman peak can be clearly seen at 1636 to 1614 cm$^{-1}$ due to doping of the polyaniline-dye active layer. In fact, the treated polyaniline-dye active layer shows C=N stretching due to the quinoid structure of the pernigraniline form of polyaniline. The Raman peak from 1630 to 1614 cm$^{-1}$ is due to the quinoid ring, whereas the peak from 1539 to 1534 cm$^{-1}$ is due to the benzenoid ring. The peak at 1344 to 1332 cm$^{-1}$ is due to protonated oxazine units along with the stretching vibration of C—C in the quinoid ring. However, the Raman spectra is clearly pronounced and different in doped polyaniline-dye active layers. The bands that appeared at 1188 cm$^{-1}$ and 1001 cm$^{-1}$ are due to C—H bending vibrations of semi-quininoid rings and C—H in-plane bending vibrations in the benzenoid ring is due to KCl+APS electrolyte.

Fourier transform infrared spectroscopy (FTIR) was also performed to evaluate chromatic devices. FIG. 8 is a graph that shows the FTIR spectra of a polyaniline-dye active layer deposited on a silicon substrate and treated with various electrolytes. Curve 1 shows FTIR bands at 3202, 3043, 2927, 2816, 2360, 1517, 1483, 1403, 1295, 970, 802, 693, 599, 500 and 469 cm$^{-1}$ for the polyaniline-dye active layer when treated with NaCl+APS electrolyte. The band at 3200 cm$^{-1}$ is due to N—H vibration and peak at 1517 cm$^{-1}$ is due to C—C stretching of the quinoid and benzenoid rings. The band at 1295 cm$^{-1}$ is due to the (quinoid) emeraldine structure of polyaniline and the "out-of-plane" C—H at 1870 cm$^{-1}$ for polyaniline. The band at 3043 cm$^{-1}$ is due to C=H stretching of polyaniline. However, the doped form of polyaniline is shifted to 1295 cm$^{-1}$, which is generally found at 1246 cm$^{-1}$.

Curve 2 shows FTIR bands at 3854, 3746, 3673, 3391, 3195, 3123, 3036, 2905, 2818, 2355, 1761, 1565, 1478, 1398, 1283, 1101, 790, 725, 580, 500 cm$^{-1}$ for the polyaniline-dye active layer when treated with KCl+APS electrolyte. The peaks shown at 1565, 1478, 1398, 1283, and 1101 cm$^{-1}$ are due to chlorate or chloride ions in the conducting polymer.

Curve 3 shows FTIR bands at 3869, 3753, 3318, 3202, 3043, 2355, 2036, 1630, 1420, 1275, 1072, 804, 681, 580, 500 cm$^{-1}$ for the polyaniline-dye active layer when treated with CoCl$_2$+APS electrolyte. Curve 4 shows FTIR bands at 3847, 3600, 3500, 3376, 3246, 2920, 2847, 2355, 2022, 1630, 1406, 1029, 609, 500 cm$^{-1}$ for the polyaniline-dye active layer when treated with LiCl+APS electrolyte.

Curve 5 shows FTIR bands at 3833, 3340, 2333, 2072, 1849, 1652, 1427, 1275, 1101, 674, 601, 500 cm$^{-1}$ for the polyaniline-dye active layer when treated with MgCl$_2$+APS electrolyte. The band from 3340 to 3202 cm$^{-1}$ is due to N—H bonding in polyaniline. The peak at 2818 cm$^{-1}$ is due to methylene and methyl interaction due to the group present in the dye. The band at 1565 to 1630 cm$^{-1}$ is due to C=N stretching due to the quinoid ring and 1503 cm$^{-1}$ is due to C—N stretching of the benzenoid ring. The peak at 1101 cm$^{-1}$ is due to chlorine bonding with the polyaniline-dye active layer. The band at 804 cm$^{-1}$ is due to C—H vibration out-of-plane bonding in the benzenoid ring of polyaniline. The band at 580 cm$^{-1}$ is due to C—N—C bonding in the polyaniline. The band 3500 to 3854 cm$^{-1}$ is due to vibration band of —OH in the structure of the polyaniline-dye active layer.

Figure 9A:
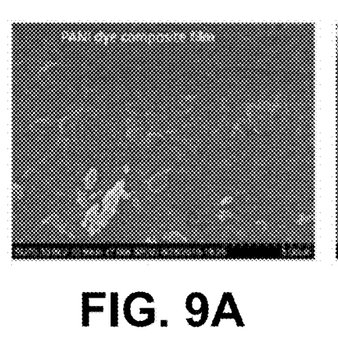
FIGS. 9A-9F are scanning electron microscope (SEM) images of chromatic devices having polyaniline-dye active layers with and without and with treatment with an electrolyte.
Figure 9B:
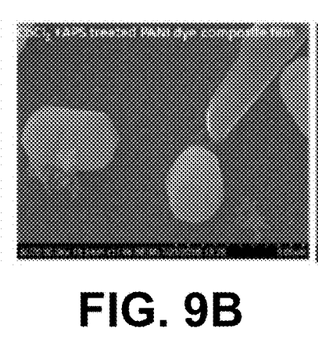
Figure 9C:
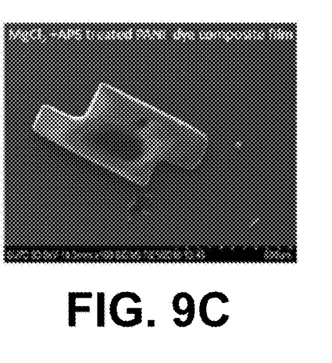
Figure 9D:
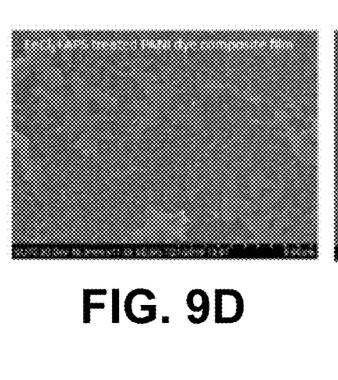
Figure 9E:
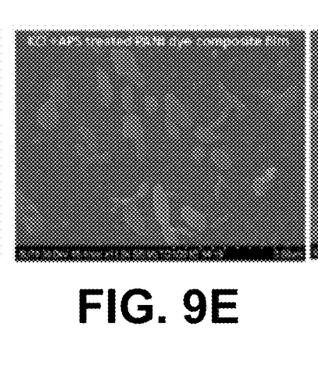
Figure 9F:
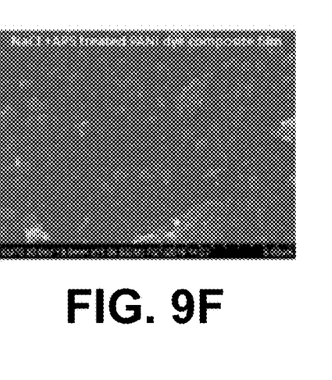

FIGS. 9A-9F are scanning electron microscope (SEM) images of a polyaniline-dye active layer both with and without and with treatment with an electrolyte. More particularly, FIG. 9A shows an untreated polyaniline-dye active layer, FIG. 9B shows a polyaniline-dye active layer treated with CoCl$_2$+APS electrolyte, FIG. 9C shows a polyaniline-dye active layer treated with MgCl$_2$+APS electrolyte, FIG. 9D shows a polyaniline-dye active layer treated with FeCl$_3$+APS electrolyte, FIG. 9E shows a polyaniline-dye active layer treated with KCl+APS electrolyte, and FIG. 9F shows a polyaniline-dye active layer treated with NaCl+APS electrolyte. The active layers were not washed after the treatment with the various electrolytes. The SEM images show the effect of the electrolyte dopant on the surface of the active layer. The KCl- and NaCl-treated active layers had small grain boundaries in the polymer structure whereas the CoCl$_2$- and MgCl$_2$-treated active layers had a crystalline salt structure across the layer.

Figure 10A:
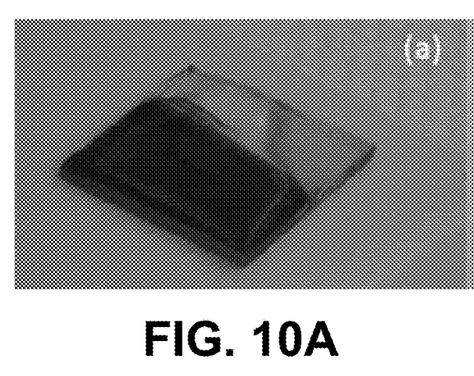
FIGS. 10A-10F are photographs that show the color change for a chromatic device having a polyaniline-dye active layer that was treated with KCl+APS electrolyte.
Figure 10B:
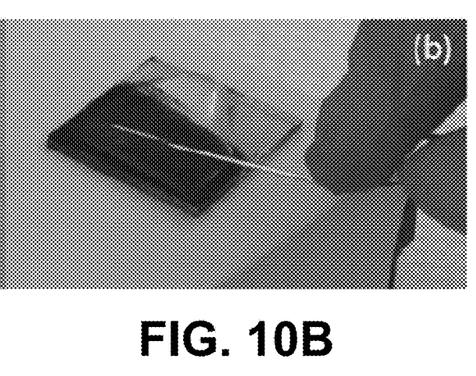
Figure 10C:
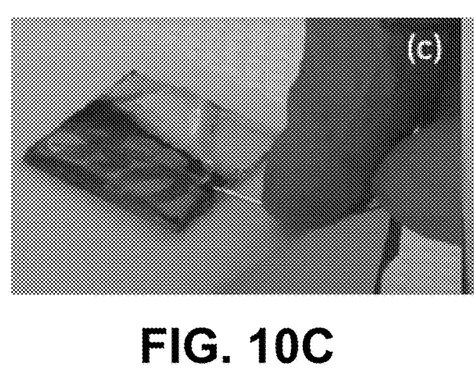
Figure 10D:
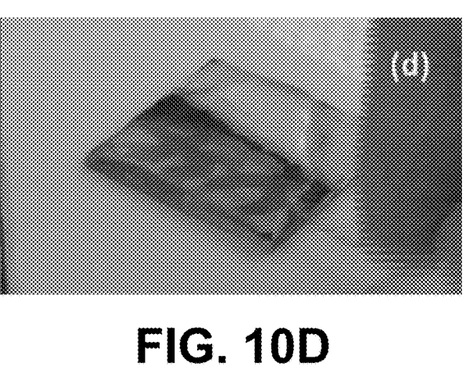
Figure 10E:
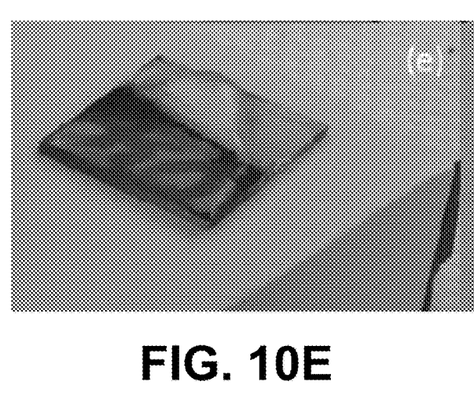
Figure 10F:
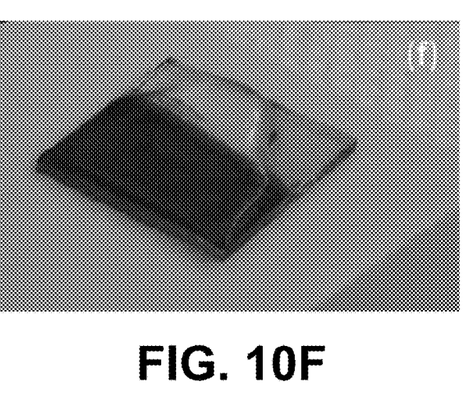

The touchchromism of the disclosed chromatic devices was also tested. Color change was observed for polyaniline-dye active layers that were treated with KCl+APS, LiCl+APS, MgCl$_2$+APS, and NaCl+APS electrolytes. FIGS. 10A-10F are photographs that show the color change for the polyaniline-dye active layer that was treated with KCl+APS electrolyte. FIG. 10A shows the polyaniline-dye active layer prior to contact with a metal element. FIGS. 10B-10D are time-sequential images of the polyaniline-dye active layer after contact with a metal element. FIGS. 10E and 10F are time-sequential images of the polyaniline-dye active layer after the contact with the metal element is removed. As can be appreciated from these photographs, the letters "USF" written on the substrate of the chromatic device are only visible when the polyaniline-dye active layer has been in contact with the metal element.

The rate at which a color change occurs within the chromatic device depends in part upon the electrolyte that is used. Table 1 identifies the time for color change for polyaniline-dye active layers treated with various electrolytes. As can be appreciated from this table, the active layer treated with the KCl+APS electrolyte exhibited color change within 5 seconds.

TABLE 1

Types of electrolyte and time of color change.

| Sr. No | Type of salts | Conc. of APS | Time of decoloration (sec) |
|---|---|---|---|
| 1) | NaCl | 0.1M | 10 |
| 2) | MgCl$_2$ | 0.1M | 12 |
| 3) | KCl | 0.1M | 5 |
| 4) | LiCl | 0.1M | 19 |
| 5) | CoCl$_2$ | 0.1M | Only at point of contact |
| 6) | FeCl$_3$ | 0.1M | No change |

It is noted that the concentration of the electrolyte can have a significant effect on the reversibility of the color change. In particular, as the salt concentration increases, the reversibility of the color change decreases. It is also noted that the electrolyte concentration effects the speed with which the color change occurs.

TABLE 2

KCl + APS based electrolyte color change for PANI-dye composite material.

| Number | Conc. of KCl | Con. of APS | Time required to change color |
|---|---|---|---|
| 1) | 0.1M | 0.1M | Only color change at point of contact and the color change does not spread |
| 2) | 0.25M | 0.1M | 14 Sec |
| 3) | 0.5M | 0.1M | 12 Sec |
| 4) | 0.75M | 0.1M | 10 Sec |
| 5) | 1M | 0.1M | 5 Sec |
| 6) | 2M | 0.1M | Only color change at point of contact and the color change does not spread |

In some embodiments, the electrolyte can be a gel. A gel electrolyte was prepared by dissolving 0.5 g of gelatin in 40 ml of deionized water and heated to 60° C.

The gel was cooled and various salt concentrations were mixed and stirred with an oxidant of 0.1M APS. The gel was applied to a polyaniline-dye active layer and a touchchromic study was performed. The active layer exhibited color change with the gel electrolytes. The color change was slower than with the aqueous-based KCl+APS electrolyte.

What is claimed is:

1. A method for controlling transmission of light, the method comprising:
   juxtaposing with a conductive window an active layer and an electrolyte layer in direct physical contact with the conductive window and the active layer, the active layer comprising a conducting polymer and the electrolyte layer comprising an oxidant and a salt but not comprising an acid,
   wherein a concentration of salt in the electrolyte layer is maintained within a range defined by a minimum value and a maximum value, and
   wherein the active layer has a color in its natural state that limits the amount of light passing through the conductive window;
and
   placing a metal element in direct physical contact with the conductive window to supply electrons from the metal element to the active layer to cause the active layer to change its color to a translucent color to increase amount of light passing through the window,
   wherein, when the concentration of salt is at the minimum value or at the maximum value, a change of color of the active layer to the translucent color occurs only at a point of contact of the metal element with the conductive window and does not spread across the active layer.

2. The method of claim 1, wherein the conducting polymer comprises one or more of a polyaniline, poly(ortho-anisidine), poly(o-toluidine), poly(ethoxy-aniline), a substituted polyaniline, a polypyrrole, a substituted polypyrrole, a polythiophene, polyindole, polycarbazole, substituted polycarbazole, polyaniline rhodamine, polypyrrole-rhodamine, and polythiophene-rhodamine.

3. The method of claim 1, wherein the oxidant of the electrolyte layer comprises one or more of aluminum nitrate, ammonium dichromate, ammonium perdisulphate, barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, ammonium nitrate, silver nitrate, benzoyl peroxide, tetranitromethane, sodium perchlorate, potassium perchlorate, potassium persulfate, sodium nitrate, and potassium chromate.

4. The method of claim 1, wherein the salt of the electrolyte layer comprises one or more of sodium chloride, cobalt(II) chloride, potassium chloride, magnesium chloride, methylmagnesium chloride, lithium chloride, lithium bromide, lithium iodide, lithium sulfate, lithium trifluoromethanesulfonate, lithium trifluoroacetate, potassium bromide, potassium iodide, isopropylmagnesium chloride, lithium sulfate monohydrate, potassium acetate, sodium acetate, potassium aspartate, sodium aspartate, potassium malate, sodium acetate, ammonium acetate, pyridinium hydrochloride, sodium nitrate, benzenediazonium chloride, N-(1-butyl)pyridinium chloride, tetra-n-butylammonium fluoride, monosodium glutamate, hydrazinium salts, urates, diazonium salts, oxalate salts, hexafluorophosphate, tartrates, aluminum monostearate, phosphonates, triphenylmethyl triphenylm ethyl hexafluorophosphate, tetrapropylammonium perruthenate, sorbates, ammonium chloride, barium chlorate monohydrate, calcium chloride anhydrous, magnesium chloride anhydrous, magnesium chromate hydrate, magnesium iodide anhydrous, magnesium nitrate hexahydrate, magnesium sulfate monohydrate, ammonium sodium phosphate dibasic tetrahydrate, manganese(II) sulfate monohydrate, magnesium bromide hexahydrate, and magnesium iodate tetrahydrate.

5. The method of claim 1, further comprising:
   disconnecting the metal element from the conductive window to cause the active layer to reverse color from the translucent color to the color in the natural state of the active layer,
   wherein a reversibility of the change of color associated with said placing and said disconnecting decreases as the concentration of the salt in the electrolyte layer decreases.

6. The method of claim 1, wherein said placing is devoid of application of external energy to the active layer.

* * * * *

UNITED STATES PATENT AND TRADEMARK OFFICE
CERTIFICATE OF CORRECTION

PATENT NO. : 11,650,474 B2
APPLICATION NO. : 17/870357
DATED : May 16, 2023
INVENTOR(S) : Manoj K. Ram et al.

Page 1 of 1

It is certified that error appears in the above-identified patent and that said Letters Patent is hereby corrected as shown below:

In the Specification

Column 4, Line 10, "$((NH_4)_2S_{208})$" should be --$((NH_4)_2S_2O_8)$--.

Column 4, Line 29, "(Lip," should be --(LiI),--.

Signed and Sealed this
Eleventh Day of July, 2023

Katherine Kelly Vidal
*Director of the United States Patent and Trademark Office*